US012112556B2

(12) United States Patent
Zhuang et al.

(10) Patent No.: US 12,112,556 B2
(45) Date of Patent: Oct. 8, 2024

(54) IMAGE RECOGNITION METHOD AND APPARATUS, RECOGNITION MODEL TRAINING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Xinrui Zhuang, Shenzhen (CN); Yuexiang Li, Shenzhen (CN); Yefeng Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 524 days.

(21) Appl. No.: 17/402,500

(22) Filed: Aug. 13, 2021

(65) Prior Publication Data
US 2021/0374475 A1 Dec. 2, 2021

Related U.S. Application Data

(63) Continuation of application No. PCT/CN2020/097273, filed on Jun. 20, 2020.

(30) Foreign Application Priority Data

Jun. 21, 2019 (CN) .......................... 201910544392.0

(51) Int. Cl.
G06V 20/64 (2022.01)
G06F 18/214 (2023.01)
(Continued)

(52) U.S. Cl.
CPC ............ G06V 20/64 (2022.01); G06F 18/214 (2023.01); G06N 7/01 (2023.01); G06V 10/774 (2022.01); G06V 10/82 (2022.01)

(58) Field of Classification Search
None
See application file for complete search history.

(56) References Cited

U.S. PATENT DOCUMENTS

2017/0213093 A1* 7/2017 Li .......................... G06N 3/08
2018/0089530 A1    3/2018 Liu et al.
(Continued)

FOREIGN PATENT DOCUMENTS

CN    107154043 A    9/2017
CN    107977963 A    5/2018
(Continued)

OTHER PUBLICATIONS

Iterative convolutional neural networks for automatic vertebra identification and segmentation in CT images, by Lessmann et al., SPIE Medical Imaging, 2018, Houston, Texas, United States (Year: 2018).*

(Continued)

Primary Examiner — Vikkram Bali
(74) Attorney, Agent, or Firm — ANOVA LAW GROUP, PLLC

(57) ABSTRACT

An image recognition method includes: obtaining a target three-dimensional (3D) image; inputting the target 3D image to a first recognition model; and obtaining the image type of the target 3D image outputted by the first recognition model. The first recognition model is configured to perform image recognition on the target 3D image to obtain an image type of the target 3D image. A convolutional block of the first recognition model is the same as a convolutional block of a second recognition model, and configured to perform image recognition on the target 3D image. The second recognition model is obtained by training an original recognition model using a target training sample, the target training sample including cubes obtained by rotating and sorting N target (Continued)

cubes obtained from a 3D sample image, N being a natural number greater than 1.

19 Claims, 8 Drawing Sheets

(51) Int. Cl.
  *G06N 7/01* (2023.01)
  *G06V 10/774* (2022.01)
  *G06V 10/82* (2022.01)

(56) References Cited

U.S. PATENT DOCUMENTS

| | | | |
|---|---|---|---|
| 2018/0260621 A1 | 9/2018 | Zhou et al. | |
| 2019/0384047 A1* | 12/2019 | Johnson | G06F 18/2413 |

FOREIGN PATENT DOCUMENTS

| | | |
|---|---|---|
| CN | 108389201 A | 8/2018 |
| CN | 109063753 A | 12/2018 |
| CN | 109147940 A | 1/2019 |
| CN | 109886933 A | 6/2019 |
| CN | 110263724 A | 9/2019 |

OTHER PUBLICATIONS

Japan Patent Office (JPO) the Office Action For JP Application No. 2021-547115 Aug. 29, 2022 10 Pages (Translation Included).

The World Intellectual Property Organization (WIPO) International Search Report for PCT/CN2020/097273 Sep. 29, 2020 6 Pages (including translation).

The European Patent Office (EPO) the Extended European Search Report for 20825586.9 Jun. 22, 2022 12 pages.

Yuhua Chen et al., "Brain MRI super resolution using 3D deep densely connected neural networks," 2018 IEEE 15th International Symposium on Biomedical Imaging (ISBI 2018), IEEE, Apr. 4, 2018 (Apr. 4, 2018), pp. 739-742. 4 pages.

Korean Intellectual Property Office (KIPO) Office Action 1 for 520050388561 Oct. 22, 2023 7 Pages.

Worrall, D., & Brostow, G. "Cubenet: Equivariance to 3d rotation and translation", Proceedings of the European Conference on Computer Vision (ECCV), pp. 567-584. (Sep. 14, 2018).

* cited by examiner

IMAGE RECOGNITION METHOD AND APPARATUS, RECOGNITION MODEL TRAINING METHOD AND APPARATUS, AND STORAGE MEDIUM

CROSS-REFERENCES TO RELATED APPLICATIONS

This application is a continuation application of PCT Patent Application No. PCT/CN2020/097273, entitled "Image identification method and device, identification model training method and device, and storage medium" and filed on Jun. 20, 2020, which claims priority to the Chinese Patent Application No. 201910544392.0, entitled "Image identification method, identification model training method, device and storage medium" and filed on Jun. 21, 2019, the entire contents of both of which are incorporated herein by reference.

FIELD OF THE TECHNOLOGY

The present disclosure relates to the field of computers, and in particular, to an image recognition method and apparatus, a recognition model training method and apparatus, and a storage medium.

BACKGROUND OF THE DISCLOSURE

In the related art, when a type of a three-dimensional (3D) image is recognized, it is usually necessary to train a 3D model by using a large quantity of 3D image samples, and then the type of the 3D image may be recognized by using the trained 3D model.

However, if the foregoing method is used, it takes a long time to train the model, resulting in low model training efficiency.

SUMMARY

Embodiments of the present disclosure provide an image recognition method and apparatus, a recognition model training method and apparatus, and a storage medium, to improve the model training efficiency and also improve the image recognition accuracy.

An embodiment of the present disclosure provides an image recognition method, including: obtaining a target three-dimensional (3D) image; inputting the target 3D image to a first recognition model; and obtaining the image type of the target 3D image outputted by the first recognition model. The first recognition model is configured to perform image recognition on the target 3D image to obtain an image type of the target 3D image. A convolutional block of the first recognition model is the same as a convolutional block of a second recognition model, and configured to perform image recognition on the target 3D image. The second recognition model is obtained by training an original recognition model using a target training sample, the target training sample including cubes obtained by rotating and sorting N target cubes obtained from a 3D sample image, N being a natural number greater than 1.

An embodiment of the present disclosure further provides a recognition model training method, performed by a network device. The network device includes one or more processors, a memory, and one or more programs, where the one or more programs are stored in the memory, the program includes one or more units, each of the one or more units corresponds to a set of instructions, and the one or more processors are configured to execute instructions. The method includes: obtaining a 3D sample image, and segmenting N target cubes from the 3D sample image, N being a natural number greater than 1; rotating and sorting the N target cubes to obtain a target training sample; and training an original recognition model by using the target training sample, to obtain a second recognition model, a convolutional block of the second recognition model being the same as a convolutional block of a first recognition model, and being configured to perform image recognition on a target 3D image by using the first recognition model, to obtain an image type of the target 3D image.

An embodiment of the present disclosure further provides an image recognition apparatus, including: a first obtaining unit, configured to obtain a target 3D image; a first input unit, configured to input the target 3D image to a first recognition model, and a second obtaining unit, configured to obtain the type of the target 3D image outputted by the first recognition model. The first recognition model is configured to perform image recognition on the target 3D image to obtain an image type of the target 3D image. A convolutional block of the first recognition model is the same as a convolutional block of a second recognition model, and configured to perform image recognition on the target 3D image. The second recognition model is obtained by training an original recognition model using a target training sample, the target training sample including cubes obtained by rotating and sorting N target cubes obtained from a 3D sample image, N being a natural number greater than 1.

An embodiment of the present disclosure further provides a recognition model training apparatus, including: a segmentation unit, configured to obtain a 3D sample image, and segment N target cubes from the 3D sample image, N being a natural number greater than 1; a processing unit, configured to rotate and sort the N target cubes to obtain a target training sample; and a training unit, configured to train an original recognition model by using the target training sample, to obtain a second recognition model, a convolutional block of the second recognition model being the same as a convolutional block of a first recognition model, and being configured to perform image recognition on a target 3D image by using the first recognition model, to obtain a type of the target 3D image.

An embodiment of the present disclosure further provides a non-transitory storage medium, storing a computer program, the computer program, when run, being configured to perform the foregoing image recognition method.

An embodiment of the present disclosure further provides an electronic apparatus, including a memory, a processor, and a computer program that is stored in the memory and may be run on the processor, the processor performing: obtaining a target three-dimensional (3D) image; inputting the target 3D image to a first recognition model; and obtaining the image type of the target 3D image outputted by the first recognition model. The first recognition model is configured to perform image recognition on the target 3D image to obtain an image type of the target 3D image. A convolutional block of the first recognition model is the same as a convolutional block of a second recognition model, and configured to perform image recognition on the target 3D image. The second recognition model is obtained by training an original recognition model using a target training sample, the target training sample including cubes obtained by rotating and sorting N target cubes obtained from a 3D sample image, N being a natural number greater than 1.

Through the application of the image recognition method and apparatus, the recognition model training method and apparatus, and the storage medium according to the embodiments of the present disclosure, the first recognition model is trained before the first recognition model is used, thereby improving the training efficiency of the first recognition model and also improving the image recognition accuracy.

BRIEF DESCRIPTION OF THE DRAWINGS

The accompanying drawings described herein are used for providing a further understanding of the present disclosure, and form part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

To make a person skilled in the art understand solutions of the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts fall within the protection scope of the present disclosure.

In this specification, the claims, and the accompanying drawings of the present disclosure, the terms "first", "second", and so on are intended to distinguish similar objects but do not necessarily indicate a specific order or sequence. The data used in this way may be interchanged in an appropriate case, so that the embodiments of the present disclosure described herein can be implemented in a sequence other than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Magnetic resonance imaging (MRI) is one type of medical imaging.

Computed Tomography (CT) is one type of medical imaging, and may be used for examining a plurality of diseases.

A convolutional neural network (CNN) is used.

Multimodal brain tumor segmentation (BRATS) is used.

A feature map is obtained through convolution of an image and a filter. In actual application, the feature map may be convolved with the filter to generate a new feature map.

A Siamese network includes several CNNs with same structure, and the networks may share weight parameters with each other.

A Hamming distance is used for measuring a quantity of different characters at corresponding positions in two character strings.

A fully convolutional network (FCN) is a convolutional network of an image segmentation technology, and is formed by convolutional layers and pooling layers.

An embodiment of the present disclosure provides an image recognition method. The image recognition method is applicable to, but not limited to, an environment shown in FIG. 1.

Figure 1:
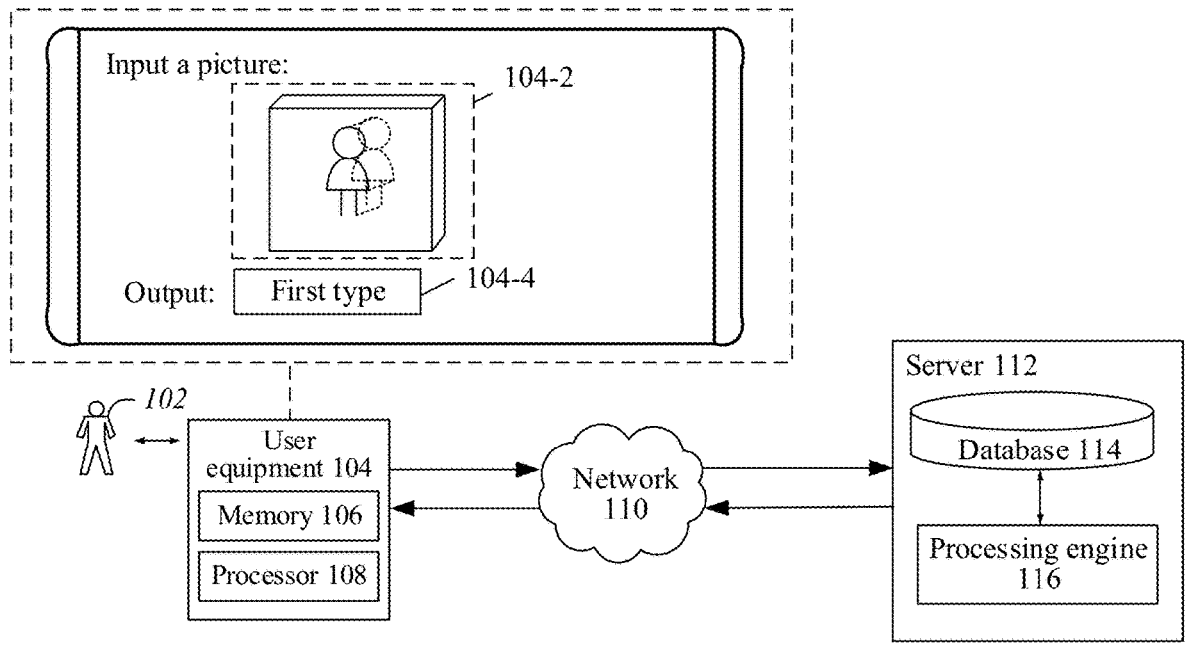
FIG. 1 is a schematic diagram of an application environment of an image recognition method according to an embodiment of the present disclosure.

In FIG. 1, a user 102 may perform human-computer interaction with user equipment 104. The user equipment 104 includes a memory 106 configured to store interaction data and a processor 108 configured to process the interaction data. The user equipment 104 and a server 112 may perform data exchange with each other through a network 110. The server 112 includes a database 114 configured to store interaction data and a processing engine 116 configured to process the interaction data. The user equipment 104 includes a first recognition model. The user equipment 104 may obtain a target 3D image 104-2, perform image recognition on the target 3D image 104-2, and output an image type 104-4 of the target 3D image 104-2.

In some embodiments, the foregoing image recognition method is applicable to, but not limited to, terminals capable of data computing, for example, a mobile phone, a tablet computer, a laptop computer, a personal computer (PC) or other terminals. The network may include, but not limited to, a wireless network or a wired network. The wireless network includes: Bluetooth, Wi-Fi, and another network implementing wireless communication. The wired network may include, but not limited to, a wide area network, a metropolitan area network, and a local area network. The server may include, but not limited to, any hardware device capable of performing computing. For example, the server may be an independent physical server, may be a server cluster including a plurality of physical servers or a distributed system, or may be a cloud server for providing basic cloud computing services such as a cloud service, a cloud database, cloud computing, a cloud function, cloud storage, a network service, cloud communication, a middleware service, a domain name service, a security service, and a big data and artificial intelligence platform.

Figure 2:
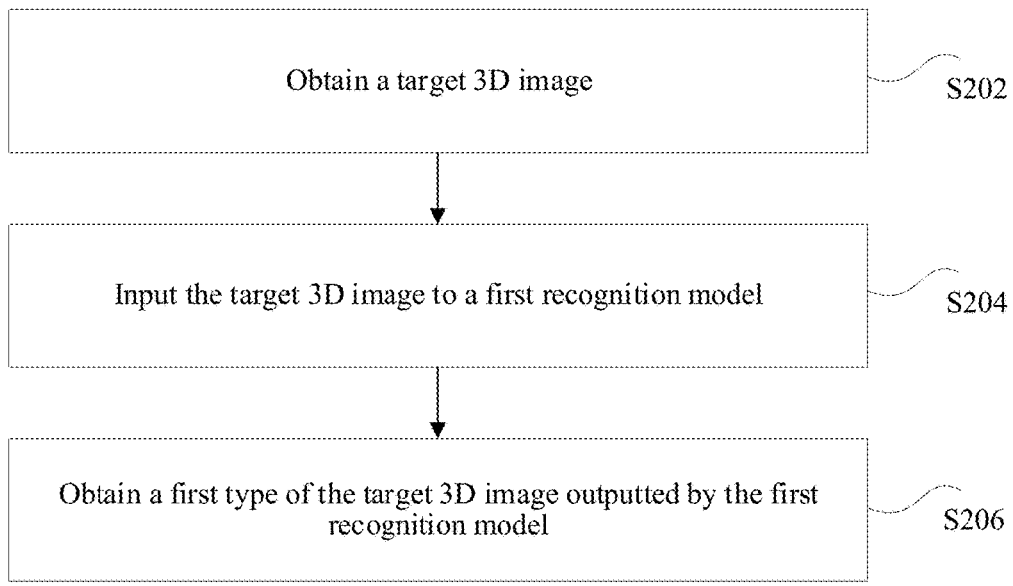
FIG. 2 is a schematic flowchart of an image recognition method according to an embodiment of the present disclosure.

In some embodiments, as shown in FIG. 2, the foregoing image recognition method includes the following steps:

S202. Obtain a target 3D image to be recognized.

S204. Input the target 3D image to a first recognition model.

The first recognition model is configured to perform image recognition on the target 3D image to obtain an image type of the target 3D image.

A convolutional block of the first recognition model is the same as a convolutional block of a second recognition model, and is configured to perform image recognition on the target 3D image.

The second recognition model is obtained by training an original recognition model using a target training sample. The target training sample includes cubes obtained by rotating and sorting N target cubes obtained from a 3D sample image, N being a natural number greater than 1.

S206. Obtain a first type of the target 3D image outputted by the first recognition model.

In some embodiments, the foregoing image recognition method is applicable to, but not limited to, the field of image recognition. For example, the method is applicable to a process of recognizing the type of the 3D image, for example, a process of recognizing a type of a disease in a 3D disease image. For example, during recognition of a type of cerebral hemorrhage, after a 3D disease image (the 3D disease image may be an MRI image or a CT image) is obtained, the 3D disease image is inputted to the first recognition model and recognized by using the first model, and a first type of the 3D disease image is outputted. For example, the first type may be health, or aneurysm, arteriovenous malformation, moyamoya disease, hypertension, or the like.

In the foregoing method, because the second recognition model is pre-trained by using the cube extracted from the 3D image, the training efficiency of the second recognition model is improved; the convolutional block of the second recognition model is used as the convolutional block of the first recognition model, and the 3D image is recognized by using the first recognition model, thereby greatly improving the training efficiency of the first recognition model.

In some embodiments, before the target 3D image is obtained, the second recognition model needs to be trained first. During training, the 3D sample image needs to be obtained first. The 3D sample image is an image without tag annotation. After the 3D sample image is obtained, an original cube needs to be extracted from the 3D sample image, and the original cube is split into N target cubes.

In some embodiments, when the original cube is extracted, a geometric center of the 3D sample image may be determined first. After the geometric center is determined, the geometric center is used as a geometric center of the original cube, and the original cube is determined. A side length of the original cube is less than a minimum side length of the 3D sample image.

Figure 3:
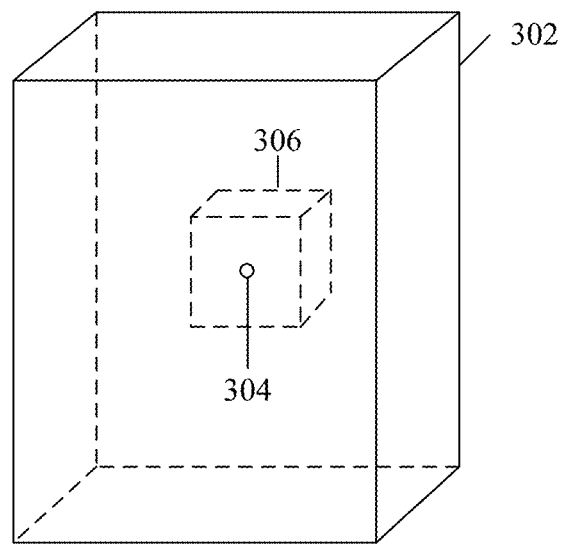
FIG. 3 is a schematic diagram of an image recognition method according to an embodiment of the present disclosure.

For example, as shown in FIG. 3, for a 3D sample image 302, a geometric center 304 of the 3D sample image 302 is first determined, and the geometric center 304 is then determined as a geometric center of the original cube 306.

In some embodiments, after the geometric center of the 3D sample image is determined, a radius r may be further determined, and then a sphere is made by using the geometric center of the 3D sample image as a spherical center and the radius r as a spherical radius; any point is then selected from the sphere as the geometric center of the foregoing original cube, to determine the foregoing original cube. The determined original cube is located in the 3D sample image, and is not out of a range of the 3D sample image.

Figure 4:
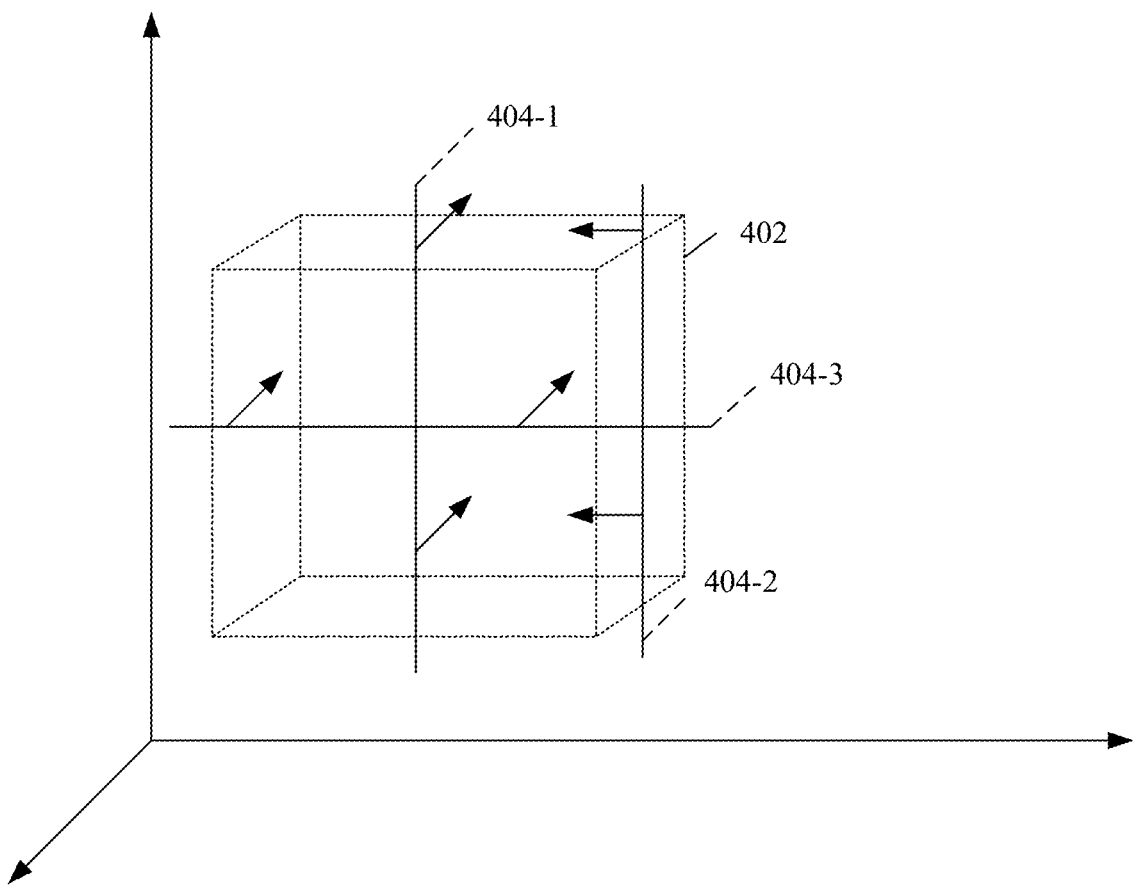
FIG. 4 is a schematic diagram of another image recognition method according to an embodiment of the present disclosure.
Figure 5:
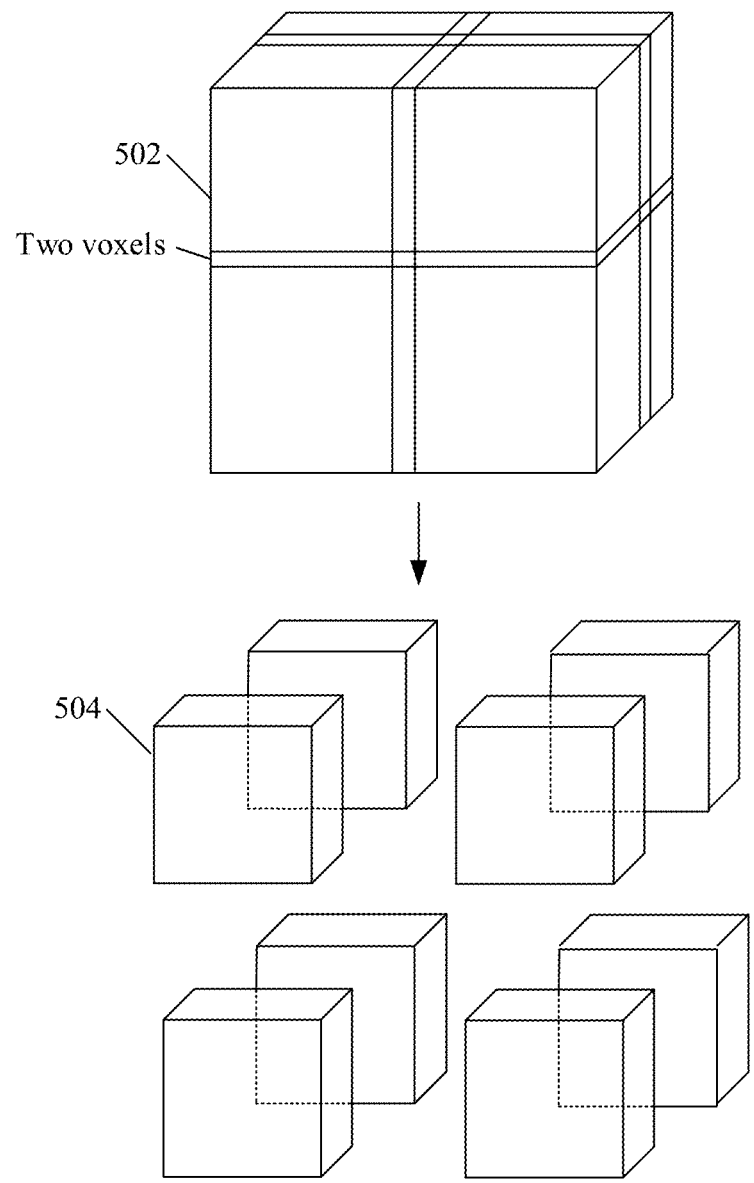
FIG. 5 is a schematic diagram of still another image recognition method according to an embodiment of the present disclosure.

In some embodiments, after the original cube is determined, the original cube needs to be split, to obtain the N target cubes. During splitting, any method may be used, such as randomly digging out the N target cubes from the original cube or splitting a part of the original cube to obtain the N target cubes. Alternatively, the original cube is evenly split into the N target cubes, N being a third power of a positive integer. For example, N is equal to 8. As shown in FIG. 4, an original cube 404 is split in directions indicated by arrows 402-1, 402-2 and 402-3 to obtain 8 target cubes (the splitting method in FIG. 4 is merely an example). Alternatively, during splitting, an interval between every two adjacent cubes is M voxels. For example, M is equal to 2. As shown in FIG. 5, an original cube 502 is split into 8 target cubes 504. If a side length of the original cube 502 is 10 voxels, a side length of the target cube 504 is 4 voxels.

In some embodiments, after the N target cubes are obtained, a first target cube in the N target cubes may be further rotated by a first angle such as 90 degrees or 180 degrees. There may be one or more first target cubes, and rotation angles of all first target cubes may be the same or different. The rotated first target cube and remaining non-rotated target cubes are sorted, and the sorting may be performed randomly (i.e., the rotated first target cube and remaining non-rotated target cubes are shuffled and their position arrangements are randomized), to obtain a target training sample after sorting/shuffling.

After the target training sample is obtained, the original recognition model is trained by using the target training sample, and the original recognition model outputs probabilities of a rotation type of each target cube and sorting sequences of the target cubes in the target training sample. The probability may or may not meet a first target function. The first target function may be a loss function. If the probability meets the first target function, it indicates that a recognition result of the original recognition model is correct. If the probability does not meet the first target function, it indicates that the recognition result of the original recognition model is incorrect and the process iterates the steps of training (re-training) the original recognition model using target training samples, obtaining an updated recognition result, and stops the iteration when a probability that the updated recognition result meets a first target function is greater than a first threshold. The method also includes determining the original recognition model as the second recognition model when a probability that the recognition result meets a first target function is greater than a first threshold. It indicates that accuracy of the second recognition model is greater than the first threshold. For example, the accuracy reaches more than 99.95%.

The training efficiency of the second recognition model is greatly improved by using the foregoing training method.

Figure 6:
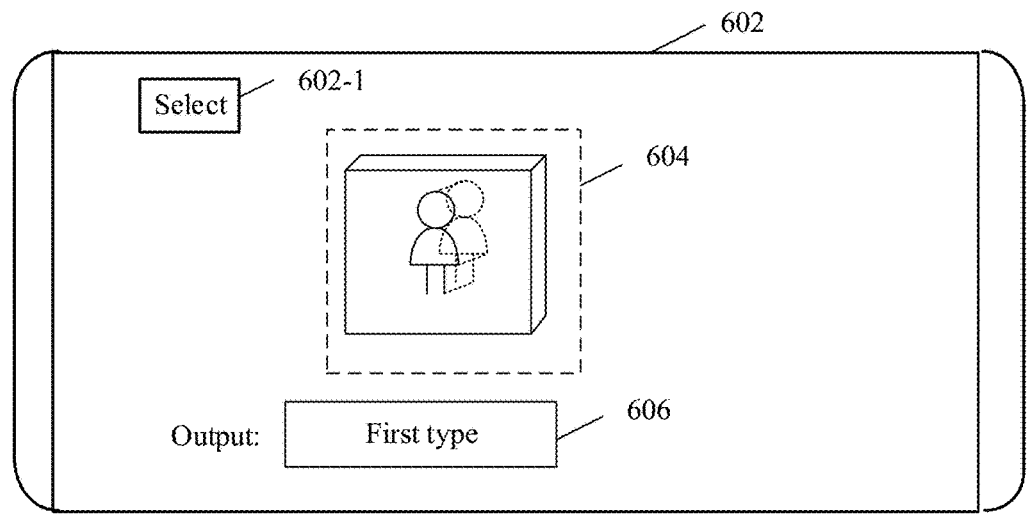
FIG. 6 is a schematic diagram of still another image recognition method according to an embodiment of the present disclosure.

In some embodiments, after the second recognition model is obtained through training, the convolutional block of the second recognition model may be obtained, the convolutional block is used as the convolutional block of the first recognition model, and the first recognition model is trained by using a first training sample. The first training sample is a 3D image including an image type. After the recognition accuracy of the first recognition model is greater than a second threshold, the first recognition model may be put into use. For example, a disease type of the 3D image is recognized. As shown in FIG. 6, a selection button 602-1 is displayed on a display interface 602 of a terminal, a user may select a target 3D image 604, and the terminal recognizes the target 3D image 604, and outputs a first type 606 of the target 3D image.

For example, when a brain disease is recognized, a public BRATS-2018 brain glioma segmentation dataset and a cerebral hemorrhage classification dataset acquired from a cooperative hospital may be obtained, and are used as experimental data.

The BRATS-2018 dataset includes MRI images of 285 patients, the MRI image of each patient includes four different modalities: T1, T1Gd, T2, and FLAIR, all data of different modalities is registered together, and a size of each image is 240×240×155.

The cerebral hemorrhage dataset includes 1486 brain CT scan images of cerebral hemorrhage, and types of the cerebral hemorrhage are aneurysm, arteriovenous malformation, moyamoya disease, and hypertension. A size of each CT image is 230×270×30.

Figure 7:
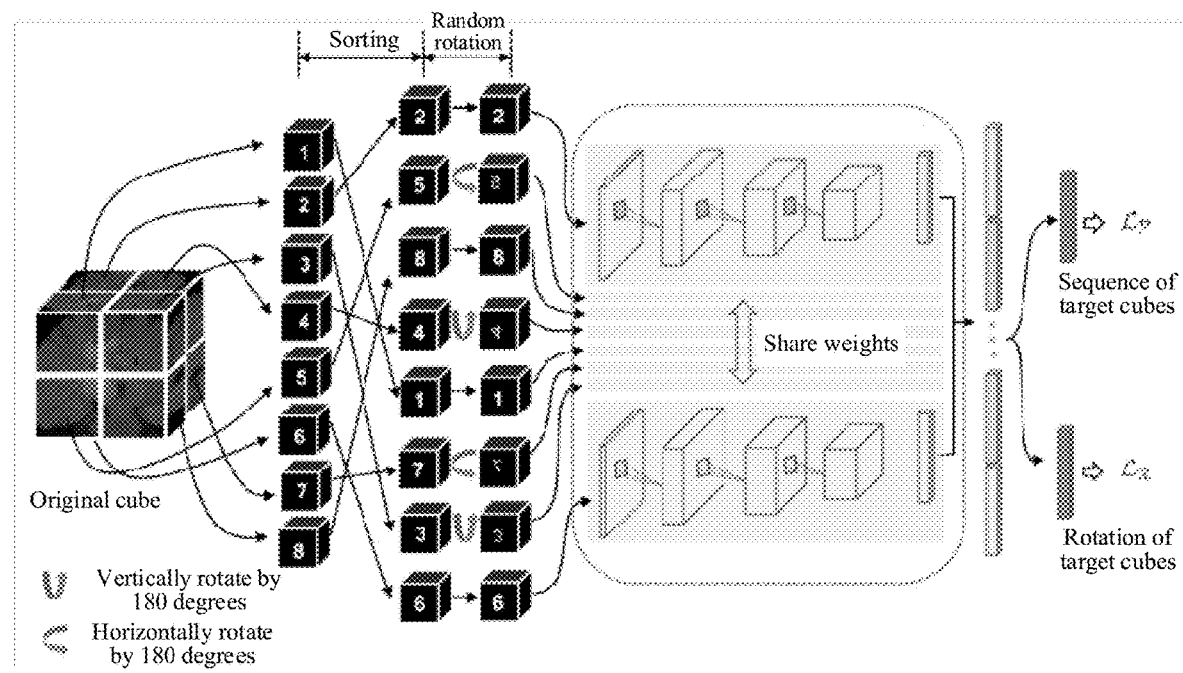
FIG. 7 is a schematic diagram of still another image recognition method according to an embodiment of the present disclosure.

The foregoing images are used for training the second recognition model. As shown in FIG. 7, for an image, an original cube is extracted from the image, and the original cube is split into target cubes. For an example method of selecting the original cube, refer to the foregoing example, and details are not repeated herein. After the original cube is selected, to encourage the network to learn high-level semantic feature information rather than low-level statistical feature information of pixel distribution through a proxy task of restoration of a Rubik's cube, when the original cube is segmented to obtain the target cube, a random interval within 10 voxels is reserved between two adjacent target cubes, and a [−1, 1] normalization operation is then performed on voxels in each target cube, to obtain a target training sample.

After the target training sample is obtained, the second recognition model needs to be trained. As shown in FIG. 7, a Siamese network includes X sub-networks that share weights with each other, where X represents a quantity of target cubes. An eight-in-one Siamese network having an input of 8 target cubes is used in an experiment, and sub-networks have the same network structure and share weights with each other. A backbone structure of each sub-network may use various types of existing 3D CNNs, and a 3D VGG (Visual Geometry Group) network is used in the experiment. Feature maps outputted by last fully-connected layers of all the sub-networks are superposed and then inputted into different branches, to be separately used for a spatial rearrangement task of the target cubes and a rotation determining task of the target cubes. The feature map is content outputted by any network in a convolution model.

1. Rearrangement of Target Cubes

For the restoration task of the Rubik's cube in this solution, the first step is to rearrange the target cubes. A pocket cube is used as an example. As shown in FIG. 7, there are a total of 2×2×2=8 target cubes. All permutation and combination sequences P=(P1, P2, ... , P8!) of the 8 target cubes are first generated, and the permutation sequences control the complexity of the restoration task of the Rubik's cube. If two permutation sequences are too similar to each other, a learning process of the network becomes very simple, and it is difficult to learn complex feature information. To ensure the effectiveness of learning, a Hamming distance is used as a measurement index, and K sequences that vary greatly from each other are sequentially selected. For training input data of each restoration of the Rubik's cube, one sequence such as (2, 5, 8, 4, 1, 7, 3 or 6) is randomly extracted from the K sequences, and the trimmed 8 target cubes are then rearranged according to an order of the sequence. The rearranged target cubes are then sequentially inputted to the network, and a learning objective of the network is to finally determine a position of the inputted sequence in the K sequences. Therefore, a loss function for the rearrangement of the target cubes is as follows:

$$loss_P = -\sum_{j=1}^{k} l_j^* \log p_j \qquad (1)$$

In the formula, lj represents a one-hot tag of a true tag of the sequence, and pj represents a prediction probability outputted by the network for each sequence.

2. Rotation of Target Cubes

A new operation, that is, the rotation of the target cubes, is added to the restoration task of the 3D Rubik's cube, and by using this operation, the network may learn a rotation-invariant feature of a 3D image block.

The target cubes are generally of cube structures. If a target cube is allowed to rotate freely in space, there are 3 (rotation axes: x, y, and z axis)×2 (rotation directions: clockwise, counterclockwise)×4 (rotation angles: 0, 90°, 180°, and 270°)=24 different possibilities. To reduce the complexity of the task and limit rotation options of the target cubes, it is specified that the target cubes can only rotate 180° in a horizontal or vertical direction. As shown in FIG. 2, cube blocks 3 and 4 rotate by 180° in the horizontal direction, and cube blocks 5 and 7 rotate by 180° in the vertical direction. After the rotated cube blocks are inputted into the network, the network needs to determine the type of rotation of each target cube. Therefore, a loss function for a cube block rotation task is as follows:

$$loss_R = -\sum_{i=1}^{M} (g_i^{hor*} \log r_i^{hor} + g_i^{ver*} \log r_i^{ver}) \qquad (2)$$

In the formula, M represents the quantity of target cubes, $g_i^{hor}$ represents a one-hot tag for vertical rotation of the target cube, $g_i^{ver}$ represents a one-hot tag for horizontal rotation of the target cube, and $r_i^{hor}$ and $r_i^{ver}$ respectively represent predicted output probabilities of the network in the vertical and horizontal directions.

According to the foregoing definition, the target function of the model is linear weighting of a permutation loss function and a rotation loss function, and an overall loss function of the model is as follows:

$$loss = a^* loss_P + b^* loss_R \qquad (3)$$

where a and b are weights of the two loss functions respectively, and control the mutual influence between two subtasks; the two weight values are both set to 0.5 in the experiment, so that the pre-training can achieve a better effect.

After the foregoing training, the second recognition model may be obtained. The second recognition model has higher accuracy than the first threshold.

In this case, the convolutional block of the second recognition model may be extracted, and is used for another target task after being finely adjusted.

For example, the convolutional block of the second recognition model is extracted, and is used in the first recognition model to perform image recognition on the type of the 3D image. For a classification task, only a fully-connected layer after a CNN network needs to be retrained, and convolutional layers before the fully-connected layer may be finely adjusted by using a smaller learning rate.

Figure 8:
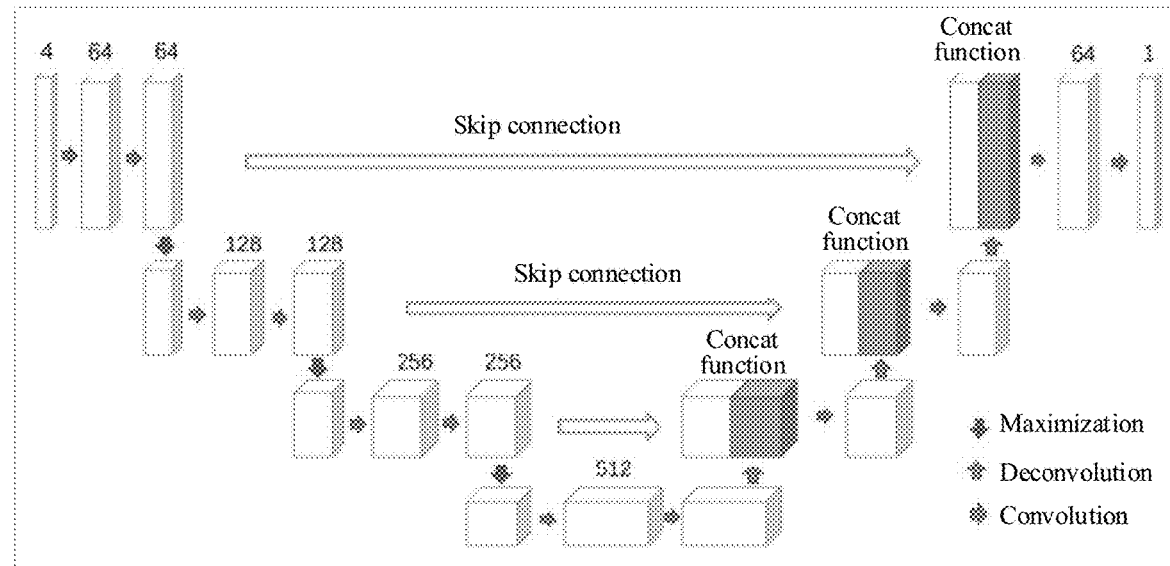
FIG. 8 is a schematic diagram of still another image recognition method according to an embodiment of the present disclosure.
Figure 9:
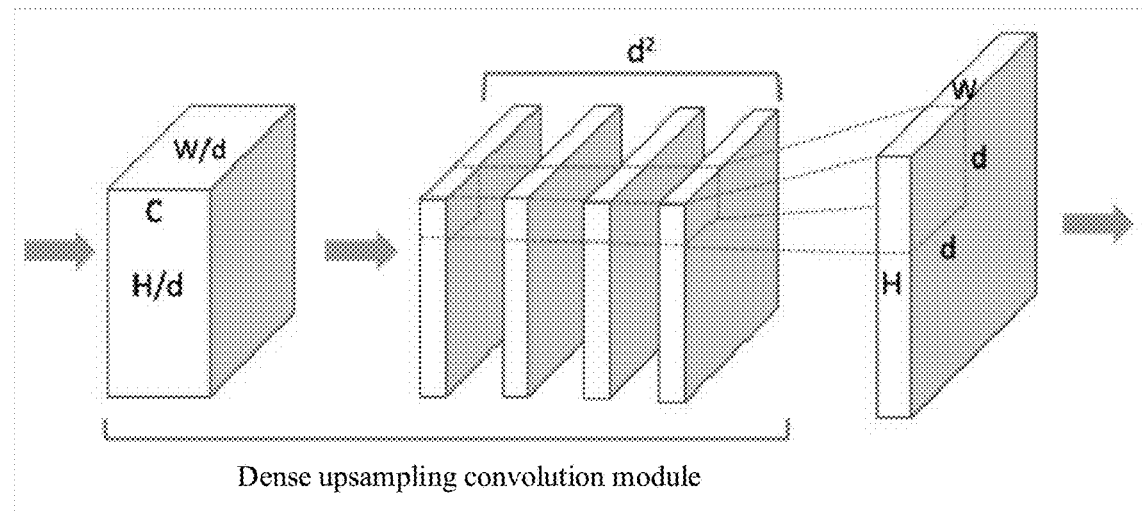
FIG. 9 is a schematic diagram of still another image recognition method according to an embodiment of the present disclosure.

Alternatively, the convolutional block of the second recognition model is used for a segmentation task. For the segmentation task, a pre-training network may use an FCN that is more commonly used in an image segmentation task, for example, a 3D U-Net structure, as shown in FIG. 8. However, the pre-training of the Rubik's cube restoration at an early stage can only be used for a U-Net downsampling stage, and random initialization still needs to be performed during training of network parameters of a U-Net upsampling stage. Therefore, to avoid the impact of initialization of a large quantity of parameters on an early-stage pre-training effect, the original transposed convolution is replaced with a dense upsampling convolution (DUC) module, to upsample a feature map to restore an original image input size. A structure of the DUC module is shown in FIG. 9. C represents a quantity of channels, and d represents an expansion factor. H is a length of the feature map, and W is a width of the feature map.

According to this embodiment, because the second recognition model is pre-trained by using the cube extracted from the 3D image, the training efficiency of the second recognition model is improved; the convolutional block of the second recognition model is used as the convolutional block of the first recognition model, and the 3D image is recognized by using the first recognition model, thereby greatly improving the training efficiency of the first recognition model.

In some embodiments, before the obtaining a target 3D image, the method may further include the following steps:
S1. Obtain the 3D sample image.
S2. Determine an original cube from the 3D sample image.
S3. Split the original cube into the N target cubes.

In some embodiments, the 3D sample image and the target 3D image may be the same image. That is, after the second recognition model is trained by using the 3D sample image, and a convolutional block of the second recognition model is used as the convolutional block of the first recognition model, the 3D sample image may be inputted to the first recognition model, and the first recognition model recognizes a type of the 3D sample image. When the 3D sample image is inputted to the second recognition model, there is no need to input the type of the 3D sample image.

Through the application of the foregoing embodiments of the present disclosure, before the first recognition model is used, the N target cubes are obtained to train the second recognition model, to improve the training efficiency of the second recognition model and the training efficiency of the first recognition model.

In some embodiments, N is a third power of a positive integer greater than 1, and the splitting the original cube into the N target cubes includes the following steps:
S1. Split the N target cubes from the original cube while keeping an interval of M voxels between two adjacent target cubes, M being a positive integer greater than 0 and less than J−1, J being a side length of the target cube.

In some embodiments, when the N target cubes are determined, the interval between the two adjacent target cubes is the M voxels, so that the second recognition model may learn high-level semantic feature information rather than low-level statistical feature information of pixel distribution, thereby improving the training efficiency of the second recognition model and the training efficiency of the first recognition model.

In some embodiments, before the obtaining a target 3D image, the method may further include the following steps:
S1. Determine a first target cube from the N target cubes.
S2. Rotate the first target cube by a first angle.
S3. Sort the first target cube rotated by the first angle with other target cubes in the N target cubes to obtain the target training sample.

In some embodiments, the sorting may be randomly sorting the N target cubes. The rotation may be rotating a plurality of first target cubes in the N target cubes, and the rotation may be performed at any angle.

Through the application of the foregoing embodiments of the present disclosure, before the first recognition model is used, the first target cube in the N target cubes is rotated after the N target cubes are obtained, thereby improving the training efficiency of the second recognition model and the training efficiency of the first recognition model.

In some embodiments, after the sorting the first target cube rotated by the first angle with other target cubes in the N target cubes to obtain the target training sample, the method may further include:
inputting the target training sample into the original recognition model to train the original recognition model, to obtain the second recognition model.

Through the application of the foregoing embodiments of the present disclosure, the training efficiency of the second recognition model is improved.

In some embodiments, before the obtaining a target 3D image, the method may further include the following steps:
S1. Obtain a recognition result outputted after the original recognition model recognizes the target training sample, the recognition result including probabilities of multiple sorting sequences of the target cubes in the target training sample and a rotation angle of each target cube.
S2. Determine the original recognition model as the second recognition model when a probability that the recognition result meets a first target function is greater than a first threshold.

In some embodiments, when the recognition accuracy of the second recognition model is greater than an accuracy value, it is considered that the second recognition model meets requirement. Therefore, the training of the second recognition model is stopped.

Herein, the training of the second recognition model is stopped by setting an exit condition, thereby improving the training efficiency of the second recognition model.

In some embodiments, before the obtaining a target 3D image, the method may further include the following steps:
S1. Determine the convolutional block of the second recognition model as the convolutional block of the first recognition model.
S2. Train the first recognition model by using the first training sample until accuracy of the first recognition model is greater than a second threshold, the first training sample including a first 3D image and a type of the first 3D image.

In some embodiments, when the first recognition model is trained, a first sample image with a tag may be inputted. The first recognition model is then trained until the recognition accuracy of the first recognition model is greater than a second threshold. In this case, the first recognition model may be put into use.

Through the application of the foregoing embodiments of the present disclosure, the second recognition model is obtained by training the original recognition model using the target training sample, where the target training sample includes cubes obtained by rotating and sorting the N target cubes obtained from the 3D sample image; the second recognition model is pre-trained by using the cubes extracted from the 3D image. Therefore, the training efficiency of the second recognition model and the accuracy of recognizing the 3D image are improved.

Because the convolutional block of the first recognition model is the same as the convolutional block of the second recognition model, that is, the convolutional block trained by using the second recognition model is used as the convolutional block of the first recognition model, the training efficiency of the first recognition model is improved.

The target 3D image is recognized by using the convolutional block in the first recognition model the same as that in the second recognition model, thereby improving the recognition accuracy. The first recognition model is trained before the first recognition model is used, thereby improving the training efficiency of the first recognition model.

For ease of description, the foregoing method embodiments are stated as a combination of a series of actions. However, a person skilled in the art understands that the present disclosure is not limited to the described action sequence, because according to the present disclosure, some steps may be performed in another sequence or simultaneously. In addition, a person skilled in the art is further to understand that the embodiments described in this specification are all exemplary embodiments, and the involved actions and modules are not necessarily required by the present disclosure.

Figure 10:
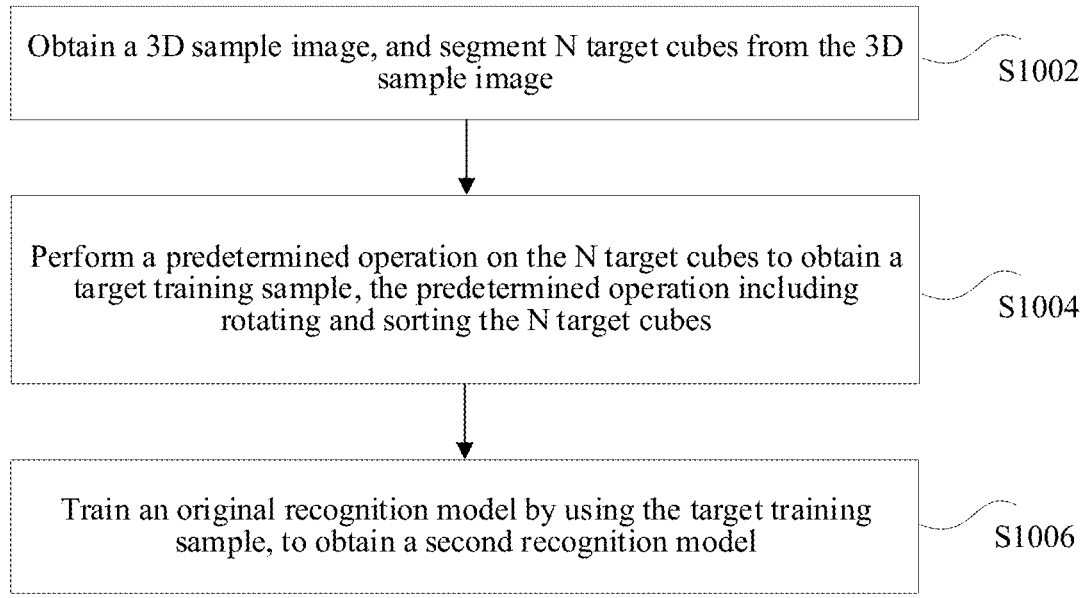
FIG. 10 is a schematic structural diagram of a recognition model training method according to an embodiment of the present disclosure.

An embodiment of the present disclosure further provides a recognition model training method. As shown in FIG. 10, the method includes the following steps:

S1002. Obtain a 3D sample image, and segment N target cubes from the 3D sample image.

N is a natural number greater than 1.

S1004. Perform a predetermined operation on the N target cubes to obtain a target training sample, the predetermined operation including rotating and sorting the N target cubes.

S1006. Train an original recognition model by using the target training sample, to obtain a second recognition model.

The original recognition model is configured to output a recognition result for the target training sample, and determine the original recognition model as the second recognition model when a probability that the recognition result meets a first target function is greater than a first threshold.

A convolutional block of the second recognition model is the same as a convolutional block of a first recognition model, and is used in the first recognition model to perform image recognition on a target 3D image, to obtain an image type of the target 3D image.

In some embodiments, the foregoing method is applicable to, but not limited to, a model training process. When the original recognition model is trained, N target cubes are extracted from a 3D sample image, and N cubes that are obtained by rotating and sorting the N target cubes are inputted to the original recognition model as the target training sample. For the methods of extraction, rotation, and sorting, refer to the methods in the foregoing embodiments, and details are not described in this embodiment again.

When the original recognition model is trained, the original recognition model outputs probabilities of a rotation type of each target cube and sorting sequences of the target cubes in the target training sample. The probability may or may not meet a first target function. The first target function may be a loss function. If the probability meets the first target function, it indicates that a recognition result of the original recognition model is correct. If the probability does not meet the first target function, it indicates that the recognition result of the original recognition model is incorrect. The current original recognition model is determined as a mature trained model when the probability that the recognition result meets the first target function is greater than the first threshold.

By using the foregoing method, the training efficiency of the original recognition model can be greatly improved.

In some embodiments, after the mature original recognition model is obtained through training, a convolutional block of the original recognition model may be extracted. After a new fully-connected layer is added, a new recognition model is formed, and another character may be recognized by using the new recognition model. The new recognition model trained by using a small quantity of samples has relatively high recognition accuracy. For example, the new recognition model is applicable to a process of recognizing a type of a 3D image, or the new recognition model is applicable to tasks such as segmentation of a 3D image. Details are not described herein again.

Figure 11:
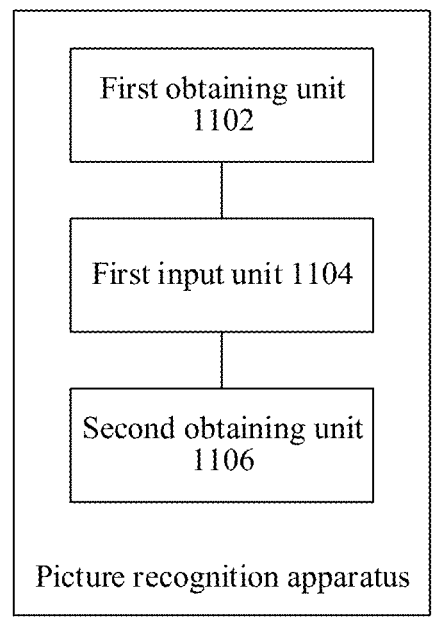
FIG. 11 is a schematic structural diagram of an image recognition apparatus according to an embodiment of the present disclosure.

An embodiment of the present disclosure further provides an image recognition apparatus configured to implement the foregoing image recognition method. As shown in FIG. 11, the apparatus includes:

a first obtaining unit 1102, configured to obtain a target 3D image;

a first input unit 1104, configured to input the target 3D image to a first recognition model, the first recognition model being configured to perform image recognition on the target 3D image to obtain an image type of the target 3D image, a convolutional block of the first recognition model being the same as a convolutional block of a second recognition model, and being configured to perform image recognition on the target 3D image, the second recognition model being obtained by training an original recognition model using a target training sample, the target training sample including cubes obtained by rotating and sorting N target cubes obtained from a 3D sample image, N being a natural number greater than 1; and a second obtaining unit 1106, configured to obtain a first type of the target 3D image outputted by the first recognition model.

In some embodiments, the foregoing image recognition apparatus is applicable to, but not limited to, the field of image recognition. For example, the method is applicable to a process of recognizing the type of the 3D image, for example, a process of recognizing a type of a disease in a 3D disease image. For example, during recognition of a type of cerebral hemorrhage, after a 3D disease image is obtained, the 3D disease image is inputted to the first recognition model and recognized by using the first model, and a first type of the 3D disease image is outputted. For example, the first type may be health, or aneurysm, arteriovenous malformation, moyamoya disease, hypertension, or the like.

In the foregoing method, because the second recognition model is pre-trained by using the cube extracted from the 3D image, the training efficiency of the second recognition model is improved; the convolutional block of the second recognition model is used as the convolutional block of the first recognition model, and the 3D image is recognized by using the first recognition model, thereby greatly improving the training efficiency of the first recognition model.

In some embodiments, before the target 3D image is obtained, the second recognition model needs to be trained first. During training, the 3D sample image needs to be obtained first. The 3D sample image is an image without tag annotation. After the 3D sample image is obtained, an original cube needs to be extracted from the 3D sample image, and the original cube is split into N target cubes.

In some embodiments, when the original cube is extracted, a geometric center of the 3D sample image may be determined first. After the geometric center is determined, the geometric center is used as a geometric center of the original cube, and the original cube is determined. A side length of the original cube is less than a minimum side length of the 3D sample image.

For example, as shown in FIG. 3, for a 3D sample image 302, a geometric center 304 of the 3D sample image 302 is first determined, and the geometric center 304 is then determined as a geometric center of the original cube 306.

In some embodiments, after the geometric center of the 3D sample image is determined, a radius r may be further determined, and then a sphere is made by using the geometric center of the 3D sample image as a spherical center and the radius r as a spherical radius; any point is then selected from the sphere as the geometric center of the foregoing original cube, to determine the foregoing original cube. The determined original cube is located in the 3D sample image, and is not out of a range of the 3D sample image.

In some embodiments, after the original cube is determined, the original cube needs to be split, to obtain the N target cubes. During splitting, any method may be used, such as randomly digging out the N target cubes from the original cube or splitting a part of the original cube to obtain the N target cubes. Alternatively, the original cube is evenly split into the N target cubes, N being a third power of a positive integer. For example, N is equal to 8. As shown in FIG. 4, an original cube 404 is split in directions indicated by arrows 402-1, 402-2 and 402-3 to obtain 8 target cubes (the splitting method in FIG. 4 is merely an example). Alternatively, during splitting, an interval between every two adjacent cubes is M voxels. For example, M is equal to 2. As shown in FIG. 5, an original cube 502 is split into 8 target cubes 504. If a side length of the original cube 502 is 10 voxels, a side length of the target cube 504 is 4 voxels.

In some embodiments, after the N target cubes are obtained, a first target cube in the N target cubes may be further rotated by a first angle such as 90 degrees or 180 degrees. There may be one or more first target cubes, and rotation angles of all first target cubes may be the same or different. The rotated first target cube and remaining non-rotated target cubes are sorted, and the sorting may be performed randomly, to obtain a target training sample after sorting.

After the target training sample is obtained, the original recognition model is trained by using the target training sample, and the original recognition model outputs probabilities of a rotation type of each target cube and sorting sequences of the target cubes in the target training sample. The probability may or may not meet a first target function. The first target function may be a loss function. If the probability meets the first target function, it indicates that a recognition result of the original recognition model is correct. If the probability does not meet the first target function, it indicates that the recognition result of the original recognition model is incorrect. determining the original recognition model as the second recognition model when a probability that the recognition result meets a first target function is greater than a first threshold. It indicates that accuracy of the second recognition model is greater than the first threshold. For example, the accuracy reaches more than 99.95%.

The training efficiency of the second recognition model is greatly improved by using the foregoing training method.

In some embodiments, after the second recognition model is obtained through training, the convolutional block of the second recognition model may be obtained, the convolutional block is used as the convolutional block of the first recognition model, and the first recognition model is trained by using a first training sample. The first training sample is a 3D image including an image type. After the recognition accuracy of the first recognition model is greater than a second threshold, the first recognition model may be put into use. For example, a disease type of the 3D image is recognized. As shown in FIG. 6, a selection button 602-1 is displayed on a display interface 602 of a terminal, a user may select a target 3D image 604, and the terminal recognizes the target 3D image 604, and outputs a first type 606 of the target 3D image.

Through the application of the foregoing embodiments of the present disclosure, because the second recognition model is pre-trained by using the cubes extracted from the 3D image, the training efficiency of the second recognition model is improved; the convolutional block of the second recognition model is used as the convolutional block of the first recognition model, and the 3D image is recognized by using the first recognition model, thereby greatly improving the training efficiency of the first recognition model.

In some embodiments, the apparatus further includes:
a third obtaining unit, configured to obtain the 3D sample image before the target 3D image is obtained;
a first determining unit, configured to determine an original cube from the 3D sample image; and
a splitting unit, configured to split the original cube into the N target cubes.

In some embodiments, the 3D sample image and the target 3D image may be the same image. That is, after the second recognition model is trained by using the 3D sample image, and a convolutional block of the second recognition model is used as the convolutional block of the first recognition model, the 3D sample image may be inputted to the first recognition model, and the first recognition model recognizes a type of the 3D sample image. When the 3D sample image is inputted to the second recognition model, there is no need to input the type of the 3D sample image.

Through the application of the foregoing embodiments of the present disclosure, before the first recognition model is used, the N target cubes are obtained to train the second recognition model, thereby improving the training efficiency of the second recognition model and training efficiency of the first recognition model.

In some embodiments, N is a third power of a positive integer greater than 1, and the splitting unit includes:
a splitting module, configured to split the N target cubes from the original cube while keeping an interval of M voxels between two adjacent target cubes, M being a positive integer greater than 0 and less than J−1, J being a side length of the target cube.

In some embodiments, when the N target cubes are determined, the interval between the two adjacent target cubes is the M voxels, so that the second recognition model may learn high-level semantic feature information rather than low-level statistical feature information of pixel distribution, thereby improving the training efficiency of the second recognition model and the training efficiency of the first recognition model.

In some embodiments, the apparatus further includes:
a second determining unit, configured to determine a first target cube from the N target cubes before the target 3D image is obtained;
a rotation unit, configured to rotate the first target cube by a first angle; and
a sorting unit, configured to sort the first target sample cube rotated by the first angle with other target cubes in the N target cubes to obtain the target training sample.

In some embodiments, the sorting may be randomly sorting the N target cubes. The rotation may be rotating a plurality of first target cubes in the N target cubes. The rotation may be performed at any angle.

Through the application of the foregoing embodiments of the present disclosure, before the first recognition model is used, after the N target cubes are obtained, the first target cube in the N target cubes is rotated, thereby improving the training efficiency of the second recognition model and the training efficiency of the first recognition model.

In some embodiments, the apparatus further includes:
a second input unit, configured to sort the first target sample cube rotated by the first angle with other target cubes in the N target cubes to obtain the target training sample, and then input the target training sample to the original recognition model to train the original recognition model, to obtain the second recognition model.

In some embodiments, the apparatus further includes:
a fourth obtaining unit, configured to obtain, before the target 3D image is obtained, a recognition result outputted after the original recognition model recognizes the target training sample, the recognition result including probabilities of multiple sorting sequences of the target cubes in the target training sample and a rotation angle of each target cube; and
a third determining unit, configured to determine the original recognition model as the second recognition model when a probability that the recognition result meets a first target function is greater than a first threshold.

In some embodiments, the apparatus further includes:
a fourth determining unit, configured to determine the convolutional block of the second recognition model as the convolutional block of the first recognition model before the target 3D image is obtained; and
a training unit, configured to train the first recognition model by using the first training sample until accuracy of the first recognition model is greater than a second threshold, the first training sample including a first 3D image and a type of the first 3D image.

In some embodiments, when the first recognition model is trained, a first sample image with a tag may be inputted. The first recognition model is then trained until the recognition accuracy of the first recognition model is greater than a second threshold. In this case, the first recognition model may be put into use.

The first recognition model is trained before the first recognition model is used, thereby improving the training efficiency of the first recognition model.

Figure 12:
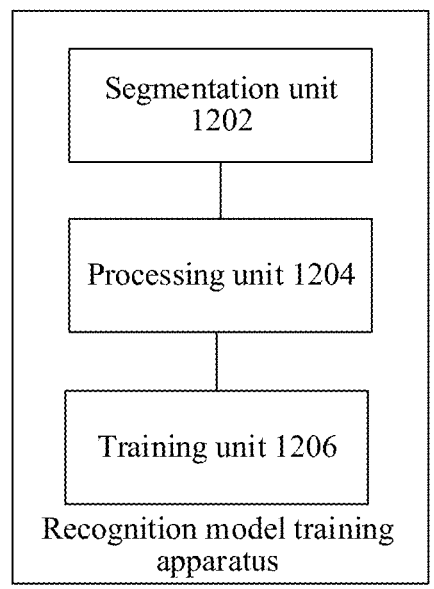
FIG. 12 is a schematic structural diagram of a recognition model training apparatus according to an embodiment of the present disclosure.

An embodiment of the present disclosure further provides a recognition model training apparatus configured to implement the foregoing recognition model training method. As shown in FIG. 12, the apparatus includes:
a segmentation unit 1202, configured to obtain a 3D sample image, and segment N target cubes from the 3D sample image;
a processing unit 1204, configured to perform a predetermined operation on the N target cubes to obtain a target training sample, the predetermined operation including rotating and sorting the N target cubes; and
a training unit 1206, configured to train the original recognition model by using the target training sample to obtain a second recognition model, the original recognition model being configured to output a recognition result for the target training sample, and determine the original recognition model as the second recognition model when a probability that the recognition result meets a first target function is greater than a first threshold.

In some embodiments, the foregoing apparatus is applicable to, but not limited to, a model training process. When the original recognition model is trained, N target cubes are extracted from a 3D sample image, and N cubes that are obtained by rotating and sorting the N target cubes are inputted to the original recognition model as the target training sample. For example methods of extraction, rotation, and sorting, refer to the methods in the foregoing embodiments, and details are not described in this embodiment again. When the original recognition model is trained, the original recognition model outputs probabilities of a rotation type of each target cube and sorting sequences of the target cubes in the target training sample. The probability may or may not meet a first target function. The first target function may be a loss function. If the probability meets the first target function, it indicates that a recognition result of the original recognition model is correct. If the probability does not meet the first target function, it indicates that the recognition result of the original recognition model is incorrect. The current original recognition model is determined as a mature trained model when the probability that the recognition result meets the first target function is greater than the first threshold.

In some embodiments, after the mature original recognition model is obtained through training, a convolutional block of the original recognition model may be extracted. After a new fully-connected layer is added, a new recognition model is formed, and another character may be recognized by using the new recognition model. The new recognition model trained by using a small quantity of samples has relatively high recognition accuracy. For example, the new recognition model is applicable to a process of recognizing a type of a 3D image, or the new recognition model is applicable to tasks such as segmentation of a 3D image. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 13:
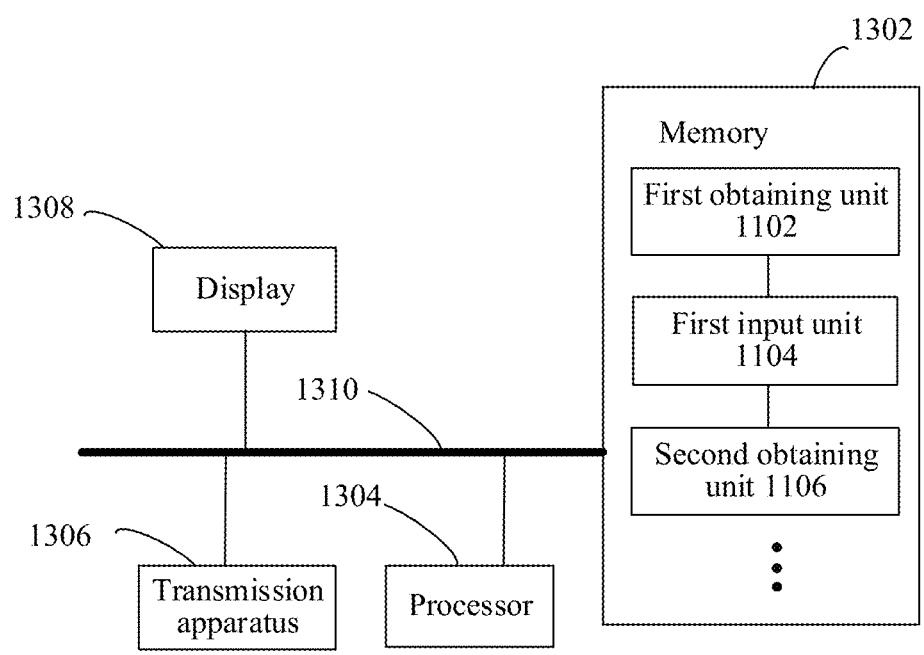
FIG. 13 is a schematic structural diagram of an electronic apparatus according to an embodiment of the present disclosure.

An embodiment of the present disclosure further provides an electronic apparatus configured to implement the foregoing image recognition method. As shown in FIG. 13, the electronic apparatus includes a memory 1302 and a processor 1304. The memory 1302 stores a computer program, and the processor 1304 is configured to perform the image recognition method according to the embodiments of the present disclosure by using the computer program.

In some embodiments, the electronic apparatus may be located in at least one of a plurality of network devices in a computer network.

In some embodiments, the processor may be configured to perform the following steps by using the computer program:

S1. Obtain a target 3D image.

S2. Input the target 3D image to a first recognition model, the first recognition model being configured to perform image recognition on the target 3D image to obtain an image type of the target 3D image, a convolutional block of the first recognition model being the same as a convolutional block of a second recognition model, the second recognition model being obtained by training an original recognition model using a target training sample, the target training sample including cubes obtained by rotating and sorting N target cubes obtained from a 3D sample image, N being a natural number greater than 1.

S3. Obtain a first type of the target 3D image outputted by the first recognition model.

In some embodiments, a person of ordinary skill in the art may understand that, the structure shown in FIG. 13 is only schematic. The electronic apparatus may be a terminal device such as a smartphone (such as an Android mobile phone or an iOS mobile phone), a tablet computer, a palmtop computer, a mobile Internet device (MID), or a PAD. FIG. 13 does not constitute a limitation on the structure of the foregoing electronic apparatus. For example, the electronic apparatus may further include more or fewer components (such as a network interface) than those shown in FIG. 13, or have a configuration different from that shown in FIG. 13.

The memory 1302 may be configured to store a software program and a module, for example, a program instruction/module corresponding to the image recognition method and apparatus in the embodiments of the present disclosure, and the processor 1304 performs various functional applications and data processing by running a software program and a module stored in the memory 1302, that is, implementing the foregoing image recognition method. The memory 1302 may include a high-speed random access memory, and may also include a non-volatile memory, for example, one or more magnetic storage apparatuses, a flash memory, or another non-volatile solid-state memory. In some embodiments, the memory 1302 may further include memories remotely disposed relative to the processor 1304, and the remote memories may be connected to a terminal through a network. Examples of the network include, but are not limited to, the Internet, an intranet, a local area network, a mobile communication network, and a combination thereof. The memory 1302 may be specifically configured to store, but not limited to, information such as the target 3D image. In an example, as shown in FIG. 13, the memory 1302 may include, but not limited to, a first obtaining unit 1102, a first input unit 1104, and a second obtaining unit 1106 in the foregoing image recognition apparatus. In addition, the memory may further include, but not limited to, other modules or units in the foregoing image recognition apparatus, and details are not described in this example again.

In some embodiments, a transmission apparatus 1306 is configured to receive or transmit data through a network. Some examples of the foregoing network may include a wired network and a wireless network. In an example, the transmission apparatus 1306 includes a network interface controller (NIC). The NIC may be connected to another network device and a router by using a network cable, to communicate with the Internet or a local area network. In an example, the transmission apparatus 1306 is a radio frequency (RF) module, which may be configured to communicate with the Internet in a wireless manner.

In addition, the electronic apparatus further includes: a display 1308, configured to display the first type of the target 3D image; and a connection bus 1310, configured to connect various module components in the foregoing electronic apparatus.

Figure 14:
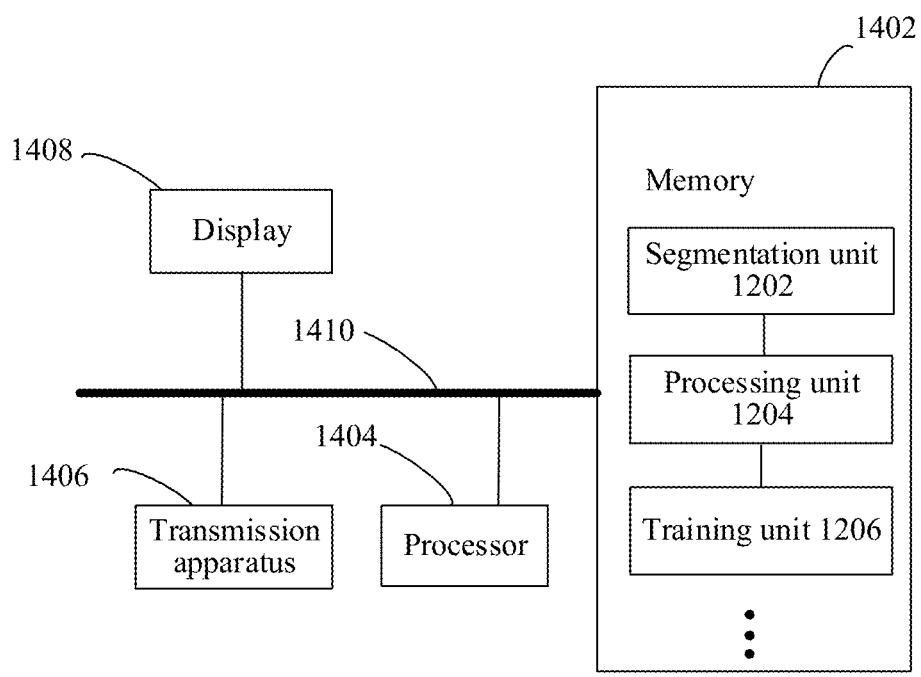
FIG. 14 is a schematic structural diagram of an electronic apparatus according to an embodiment of the present disclosure.

An embodiment of the present disclosure further provides an electronic apparatus configured to implement the foregoing recognition model training method. As shown in FIG. 14, the electronic apparatus includes a memory 1402 and a processor 1404. The memory 1402 stores a computer program, and the processor 1404 is configured to perform the foregoing recognition model training method according to the embodiments of the present disclosure by using the computer program.

In some embodiments, the electronic device may be located in at least one of a plurality of network devices in a computer network.

In some embodiments, the processor may be configured to perform the following steps by using the computer program:

S1. Obtain a 3D sample image, and segment N target cubes from the 3D sample image.

S2. Perform a predetermined operation on the N target cubes to obtain a target training sample, the predetermined operation including rotating and sorting the N target cubes.

S3. Train the original recognition model by using the target training sample to obtain a second recognition model, the original recognition model being configured to output a recognition result for the target training sample, and determine the original recognition model as the second recognition model when a probability that the recognition result meets a first target function is greater than a first threshold.

In some embodiments, a person of ordinary skill in the art may understand that, the structure shown in FIG. 14 is only schematic. The electronic device may be a terminal device such as a smartphone (such as an Android mobile phone or an iOS mobile phone), a tablet computer, a palmtop computer, a mobile Internet device (MID), or a PAD. FIG. 14 does not constitute a limitation on the structure of the foregoing electronic apparatus. For example, the electronic device may further include more or less components (such as a network interface, and the like) than those shown in FIG. 14, or have configuration different from that shown in FIG. 14.

The memory 1402 may be configured to store a software program and a module, for example, a program instruction/module corresponding to the recognition model training method and apparatus in the embodiments of the present disclosure, and the processor 1404 performs various functional applications and data processing by running a software program and a module stored in the memory 1402, that is, implementing the foregoing recognition model training method. The memory 1402 may include a high-speed random access memory, and may also include a non-volatile memory, for example, one or more magnetic storage apparatuses, a flash memory, or another non-volatile solid-state memory. In some embodiments, the memory 1402 may further include memories remotely disposed relative to the processor 1404, and the remote memories may be connected to a terminal through a network. Examples of the network include, but are not limited to, the Internet, an intranet, a local area network, a mobile communication network, and a combination thereof. The memory 1402 may be specifically configured to store, but not limited to, information such as the 3D sample image. In an example, as shown in FIG. 14, the memory 1402 may include, but not limited to, the segmentation unit 1202, the processing unit 1204, and the training unit 1206 in the foregoing recognition model training apparatus. In addition, the memory may further include, but not limited to, other modules or units in the foregoing recognition model training apparatus, and details are not described in this example again.

In some embodiments, the foregoing transmission apparatus 1406 is configured to receive or transmit data through a network. A specific example of the foregoing network may include a wired network and a wireless network. In an example, the transmission apparatus 1406 includes a network interface controller (NIC). The NIC may be connected to another network device and a router by using a network cable, to communicate with the Internet or a local area network. In an example, the transmission apparatus 1406 is a radio frequency (RF) module, which communicates with the Internet in a wireless manner.

In addition, the electronic apparatus further includes: a display 1408, configured to display training accuracy of the original recognition model; and a connection bus 1410, configured to connect various module components in the electronic apparatus.

An embodiment of the present disclosure further provides a storage medium, storing a computer program, the computer program, when run, being configured to perform the recognition model training method according to the embodiments of the present disclosure.

In some embodiments, the storage medium may be configured to store the computer program configured to perform the following steps:

S1. Obtain a target 3D image.

S2. Input the target 3D image to a first recognition model, the first recognition model being configured to perform image recognition on the target 3D image to obtain an image type of the target 3D image, a convolutional block of the first recognition model being the same as a convolutional block of a second recognition model, and being configured to perform image recognition on the target 3D image.

The second recognition model is obtained by training an original recognition model using a target training sample, the target training sample including cubes obtained by rotating and sorting N target cubes obtained from a 3D sample image, N being a natural number greater than 1.

S3. Obtain a first type of the target 3D image outputted by the first recognition model.

Alternatively, in some embodiments, the storage medium may be configured to store the computer program configured to perform the following steps:

S1. Obtain a 3D sample image, and segment N target cubes from the 3D sample image.

S2. Perform a predetermined operation on the N target cubes to obtain a target training sample, the predetermined operation including rotating and sorting the N target cubes.

S3. Train the original recognition model by using the target training sample to obtain a second recognition model, the original recognition model being configured to output a recognition result for the target training sample, and determine the original recognition model as the second recognition model when a probability that the recognition result meets a first target function is greater than a first threshold.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments of the present disclosure are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be implemented in a form of a software product. The computer software product is stored in a storage medium and includes several instructions for instructing one or more computer devices (which may be a personal computer (PC), a server, a network device, and the like) to perform all or some of the steps of the methods described in the embodiments of the present disclosure.

In the foregoing embodiments of the present disclosure, descriptions of the embodiments have respective focuses. As for parts that are not described in detail in one embodiment, reference may be made to the relevant descriptions of the other embodiments.

In the several embodiments provided in the present disclosure, it is to be understood that, the disclosed client may be implemented in another manner. The apparatus embodiments described above are merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of the present disclosure. A person of ordinary skill in the art may further make several improvements and modifications without departing from the principle of the present disclosure, and the improvements and modifications are also considered as falling within the protection scope of the present disclosure.

In the embodiments of the present disclosure, the method includes: obtaining a target 3D image; inputting the target 3D image to a first recognition model, the first recognition model being configured to perform image recognition on the target 3D image to obtain an image type of the target 3D image, a convolutional block of the first recognition model being the same as a convolutional block of a second recognition model, and being configured to perform image recognition on the target 3D image, the second recognition model being obtained by training an original recognition model using a target training sample, the target training sample including cubes obtained by rotating and sorting N target cubes obtained from a 3D sample image, N being a natural number greater than 1; and obtaining the type of the target 3D image outputted by the first recognition model. In this way, the second recognition model is obtained by training an original recognition model using a target training sample, and the target training sample includes cubes obtained by rotating and sorting N target cubes obtained from a 3D sample image. The second recognition model is pre-trained by using the cubes extracted from the 3D image, thereby improving the training efficiency of the second recognition model and also improving the accuracy of recognizing the 3D image. Because the convolutional block of the first recognition model is the same as the convolutional block of the second recognition model, that is, the convolutional block trained by using the second recognition model is used as the convolutional block of the first recognition model, the training efficiency of the first recognition model is improved. In addition, the target 3D image is recognized by using the convolutional block in the first recognition model the same as that in the second recognition model, thereby improving the recognition accuracy.

What is claimed is:

1. An image recognition method, performed by a terminal, the method comprising:
   obtaining a target three-dimensional (3D) image;
   inputting the target 3D image to a first recognition model, the first recognition model being configured to perform image recognition on the target 3D image to obtain a type of the target 3D image; and
   obtaining the type of the target 3D image outputted by the first recognition model,
   wherein the first recognition model is obtained by:
      determining N target cubes from a 3D sample image to be rotated, N being a natural number greater than 1;
      determining a plurality of candidate permutation sequences of the N target cubes;
      obtaining, based on the 3D sample image, a target training sample, the target training sample comprising cubes obtained by rotating and sorting the N target cubes based on a target permutation sequence randomly selected from the candidate permutation sequences;
      using the target training sample without tag annotation to train an original recognition model and obtain a convolutional block of the second recognition model; and
      after the second recognition model is trained, using the 3D sample image with the tag annotation and using the convolutional block of the trained second recognition model as a convolutional block of the first recognition model, to train the first recognition model, the tag annotation including a type of the 3D sample.

2. The method according to claim 1, wherein before obtaining the target 3D image, the method further comprises:
   obtaining the 3D sample image;
   determining an original cube from the 3D sample image; and
   splitting the original cube into the N target cubes.

3. The method according to claim 2, wherein a value of N is a third power of a positive integer greater than 1, and splitting the original cube into the N target cubes comprises:
   splitting the N target cubes from the original cube while keeping an interval of M voxels between two adjacent target cubes, M being a positive integer less than J−1, J being a side length of the target cube.

4. The method according to claim 1, wherein the method further comprises:
   determining a first target cube from the N target cubes;
   rotating the first target cube by a first angle; and
   rearranging the first target cube rotated by the first angle with other target cubes in the N target cubes based on the target permutation sequence to obtain the target training sample.

5. The method according to claim 1, wherein before obtaining the target 3D image, the method further comprises:
   obtaining a recognition result outputted after the original recognition model recognizes the target training sample, wherein the recognition result comprises probabilities of multiple sorting sequences of the target cubes in the target training sample and a rotation angle of each target cube; and
   determining the original recognition model as the second recognition model when a probability that the recognition result meets a first target function is greater than a first threshold.

6. The method according to claim 1, wherein before obtaining the target 3D image, the method further comprises:
   determining the convolutional block of the second recognition model as the convolutional block of the first recognition model; and
   training the first recognition model by using a first training sample until accuracy of the first recognition model is greater than a target threshold, the first training sample comprising a first 3D image and a type of the first 3D image.

7. The method according to claim 1, wherein similarities among the candidate permutation sequences are greater than a similarity measurement threshold.

8. The method according to claim 7, wherein the similarities among the candidate permutation sequences are measured by Hamming distance.

9. An image recognition apparatus, comprising a memory and a processor, the memory storing a computer program, when executing the computer program, the processor being configured top:
   obtain a target 3D image;
   input the target 3D image to a first recognition model, the first recognition model being configured to perform image recognition on the target 3D image to obtain a type of the target 3D image; and
   obtain the type of the target 3D image outputted by the first recognition model,
   wherein the first recognition model is obtained by:
      determining N target cubes from a 3D sample image to be rotated, N being a natural number greater than 1;
      determining a plurality of candidate permutation sequences of the N target cubes;
      obtaining, based on the 3D sample image, a target training sample, the target training sample comprising cubes obtained by rotating and sorting the N target cubes based on a target permutation sequence randomly selected from the candidate permutation sequences;

using the target training sample without tag annotation to train an original recognition model and obtain a convolutional block of the second recognition model; and after the second recognition model is trained, using the 3D sample image with the tag annotation and using the convolutional block of the trained second recognition model as a convolutional block of the first recognition model, to train the first recognition model, the tag annotation including a type of the 3D sample.

10. The apparatus according to claim 9, wherein the processor is further configured to:

obtain the 3D sample image before the target 3D image is obtained;

determine an original cube from the 3D sample image; and split the original cube into the N target cubes.

11. The apparatus according to claim 10, wherein a value of N is a third power of a positive integer greater than 1, and the splitting the original cube into the N target cubes comprises:

splitting the N target cubes from the original cube while keeping an interval of M voxels between two adjacent target cubes, M being a positive integer less than J−1, J being a side length of the target cube.

12. The apparatus according to claim 9, wherein the processor is further configured to:

determine a first target cube from the N target cubes;

rotate the first target cube by a first angle; and rearrange the first target cube rotated by the first angle with other target cubes in the N target cubes based on the target permutation sequence to obtain the target training sample.

13. The apparatus according to claim 9, wherein before obtaining the target 3D image, the processor is further configured to:

obtain a recognition result outputted after the original recognition model recognizes the target training sample, wherein the recognition result comprises probabilities of multiple sorting sequences of the target cubes in the target training sample and a rotation angle of each target cube; and determine the original recognition model as the second recognition model when a probability that the recognition result meets a first target function is greater than a first threshold.

14. The apparatus according to claim 9, wherein before obtaining the target 3D image, the processor is further configured to:

determine the convolutional block of the second recognition model as the convolutional block of the first recognition model; and train the first recognition model by using a first training sample until accuracy of the first recognition model is greater than a target threshold, the first training sample comprising a first 3D image and a type of the first 3D image.

15. A non-transitory computer storage medium, storing a computer program, the computer program, when executed, causing a processor to perform:

obtaining a target three-dimensional (3D) image;

inputting the target 3D image to a first recognition model, the first recognition model being configured to perform image recognition on the target 3D image to obtain a type of the target 3D image; and obtaining the type of the target 3D image outputted by the first recognition model, wherein the first recognition model is obtained by:

determining N target cubes from a 3D sample image to be rotated, N being a natural number greater than 1;

determining a plurality of candidate permutation sequences of the N target cubes;

obtaining, based on the 3D sample image, a target training sample, the target training sample comprising cubes obtained by rotating and sorting the N target cubes based on a target permutation sequence randomly selected from the candidate permutation sequences;

using the target training sample without tag annotation to train an original recognition model and obtain a convolutional block of the second recognition model; and after the second recognition model is trained, using the 3D sample image with the tag annotation and using the convolutional block of the trained second recognition model as a convolutional block of the first recognition model, to train the first recognition model, the tag annotation including a type of the 3D sample.

16. The storage medium according to claim 15, wherein before obtaining the target 3D image, the computer program further causes the processor to perform:

obtaining the 3D sample image;

determining an original cube from the 3D sample image; and splitting the original cube into the N target cubes.

17. The storage medium according to claim 16, wherein a value of N is a third power of a positive integer greater than 1, and splitting the original cube into the N target cubes comprises:

splitting the N target cubes from the original cube while keeping an interval of M voxels between two adjacent target cubes, M being a positive integer less than J−1, J being a side length of the target cube.

18. The storage medium according to claim 15, wherein the computer program further causes the processor to perform:

determining a first target cube from the N target cubes;

rotating the first target cube by a first angle; and rearranging the first target cube rotated by the first angle with other target cubes in the N target cubes based on the target permutation sequence to obtain the target training sample.

19. The storage medium according to claim 15, wherein before obtaining the target 3D image, the computer program further causes the processor to perform:

obtaining a recognition result outputted after the original recognition model recognizes the target training sample, wherein the recognition result comprises probabilities of multiple sorting sequences of the target cubes in the target training sample and a rotation angle of each target cube; and determining the original recognition model as the second recognition model when a probability that the recognition result meets a first target function is greater than a first threshold.

* * * * *